(12) United States Patent
Wang et al.

(10) Patent No.: US 11,300,750 B2
(45) Date of Patent: Apr. 12, 2022

(54) DEVICES AND METHODS FOR BUNDLING CABLES

(71) Applicant: CommScope Technologies LLC, Hickory, NC (US)

(72) Inventors: Chi-Ming Wang, Chicago, IL (US); Aviral Joshi, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/086,548

(22) Filed: Nov. 2, 2020

(65) Prior Publication Data

US 2021/0080672 A1 Mar. 18, 2021

Related U.S. Application Data

(62) Division of application No. 16/404,863, filed on May 7, 2019, now Pat. No. 10,830,978.

(60) Provisional application No. 62/669,514, filed on May 10, 2018.

(51) Int. Cl.
*G02B 6/44* (2006.01)
*D07B 1/18* (2006.01)

(52) U.S. Cl.
CPC .............. *G02B 6/4478* (2013.01); *D07B 1/18* (2013.01); *G02B 6/4479* (2013.01)

(58) Field of Classification Search
None
See application file for complete search history.

(56) References Cited

U.S. PATENT DOCUMENTS

| 4,688,888 A | * | 8/1987 | Kimmich | G02B 6/4436 385/113 |
| 4,795,856 A | | 1/1989 | Farmer | |
| 5,497,795 A | | 3/1996 | Hibbard | |
| 5,526,549 A | * | 6/1996 | Mori | F16L 5/02 16/2.1 |
| 5,541,361 A | * | 7/1996 | Friesen | H01B 7/295 174/107 |
| 5,587,115 A | * | 12/1996 | Allen | G02B 6/4459 264/1.24 |
| 5,952,615 A | * | 9/1999 | Prudhon | H01B 11/06 174/113 C |

(Continued)

FOREIGN PATENT DOCUMENTS

JP 2012249359 A 12/2012
KR 100507620 B1 8/2005

OTHER PUBLICATIONS

"International Search Report and Written Opinion corresponding to International Application No. PCT/US2019/031085 dated Sep. 19, 2019".

*Primary Examiner* — Jerry Rahll
(74) *Attorney, Agent, or Firm* — Myers Bigel, P.A.

(57) ABSTRACT

The present disclosure describes a grommet formed of a polymeric material and adapted for bundling a plurality of discrete cables, comprising a main body having a generally cylindrical profile surrounding an interior cavity, the main body further having a length, a thickness, and a longitudinal axis; and a central member integrally coupled to the main body and located within the interior cavity of the main body, the central member extending generally parallel to the longitudinal axis of the main body. Methods of bundling cables are also provided.

12 Claims, 4 Drawing Sheets

(56) References Cited

U.S. PATENT DOCUMENTS

| | | | | |
|---|---|---|---|---|
| 6,248,954 B1* | 6/2001 | Clark | ............... | H01B 11/04 174/113 R |
| 7,145,080 B1* | 12/2006 | Boisvert | ............... | H01B 11/06 174/110 R |
| 8,183,462 B2* | 5/2012 | Nordin | ............... | H01B 11/08 174/102 R |
| 8,319,104 B2* | 11/2012 | Camp, II | ............... | H01B 11/04 174/113 C |
| 8,426,732 B1* | 4/2013 | Waldner | ............... | H01B 11/06 174/110 R |
| 9,306,380 B2 | 4/2016 | Vaccaro | | |
| 9,866,004 B2 | 1/2018 | Vaccaro et al. | | |
| 9,903,510 B2 | 2/2018 | Joshi et al. | | |
| 2002/0117316 A1 | 8/2002 | Vamamoto | | |
| 2003/0230427 A1* | 12/2003 | Gareis | ............... | H01B 11/04 174/113 C |
| 2004/0055781 A1 | 3/2004 | Cornibert et al. | | |
| 2004/0124000 A1* | 7/2004 | Stipes | ............... | H01B 11/04 174/113 C |
| 2005/0103518 A1* | 5/2005 | Glew | ............... | G02B 6/4489 174/113 R |
| 2007/0275583 A1* | 11/2007 | McNutt | ............... | H01B 11/06 439/225 |
| 2007/0295526 A1* | 12/2007 | Stutzman | ............... | H01B 11/06 174/110 R |
| 2011/0061889 A1* | 3/2011 | King | ............... | H01B 7/041 174/103 |
| 2011/0155419 A1* | 6/2011 | Clark | ............... | H01B 11/08 174/130 |
| 2013/0048366 A1* | 2/2013 | O'Neil | ............... | H02G 15/117 174/350 |
| 2013/0269981 A1 | 10/2013 | Sugino et al. | | |
| 2015/0287500 A1* | 10/2015 | Mizutani | ............... | H01B 9/006 174/102 R |
| 2016/0362074 A1 | 12/2016 | Yamaguchi et al. | | |
| 2017/0122460 A1* | 5/2017 | Joshi | ............... | F16L 3/222 |
| 2017/0221606 A1 | 8/2017 | Vamamoto et al. | | |
| 2018/0135778 A1* | 5/2018 | Vaccaro | ............... | F16L 3/00 |
| 2019/0345670 A1* | 11/2019 | Wang | ............... | G02B 6/4478 |
| 2020/0041042 A1* | 2/2020 | Vaccaro | ............... | H02G 3/32 |
| 2020/0062197 A1* | 2/2020 | Nakaizumi | ............... | F16L 5/00 |

\* cited by examiner

DEVICES AND METHODS FOR BUNDLING CABLES

RELATED APPLICATION

The present application is a divisional of U.S. patent application Ser. No. 16/404,863, filed May 7, 2019, which in turn claims priority from and the benefit of U.S. Provisional Patent Application No. 62/669,514, filed May 10, 2018, the disclosures of which are hereby incorporated herein in their entireties.

FIELD OF THE INVENTION

The present invention relates to devices and methods for bundling cables.

BACKGROUND OF THE INVENTION

There are some situations where it is preferable to bundle a set of discrete cables rather than create a larger multi-drop cable. The ability to bundle cables may allow installers to employ one set of cables without having a multi-drop cable. It may also facilitate manufacturing since bundling cables could help reduce the variations of cables being made (i.e., reduces manufacturing SKU) if it is agreeable to the customer/end user. Bundling cables may also allow for a faster to market time since less additional testing would need to be completed (as opposed to that for creating an entire new product). Moreover, cable bundling may reduce the amount of product development work, and some solutions may be used on multiple types of cables as long as the size and durometer are agreeable.

SUMMARY OF THE INVENTION

A first aspect of the present invention is directed to a grommet formed of a polymeric material and adapted for bundling a plurality of discrete cables. The grommet comprises a main body having a generally cylindrical profile surrounding an interior cavity and a central member integrally coupled to the main body and located within the interior cavity of the main body. The main body further has a length, a thickness, and a longitudinal axis. The central member extends generally parallel to the longitudinal axis of the main body.

Another aspect of the present invention is directed to a braided cable bundle. The braided cable bundle comprises a plurality of discrete cables, each cable having a signal-carrying member and a protective jacket surrounding the signal-carrying member. The plurality of discrete cables are braided together to form a cable bundle.

A further aspect of the present invention is directed to a method of bundling cables. The method comprises providing a plurality of discrete cables and braiding together each of the discrete cables in a predetermined braid pattern, thereby forming a single unit of braided cables.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE INVENTION

Figure 1A:
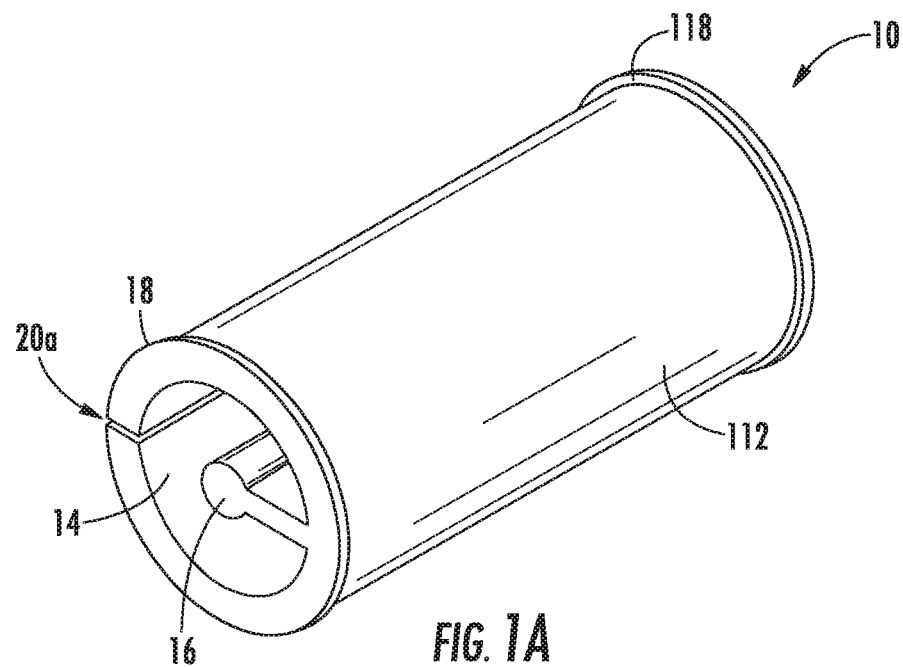
FIG. 1A is a front perspective view of a grommet according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1B:
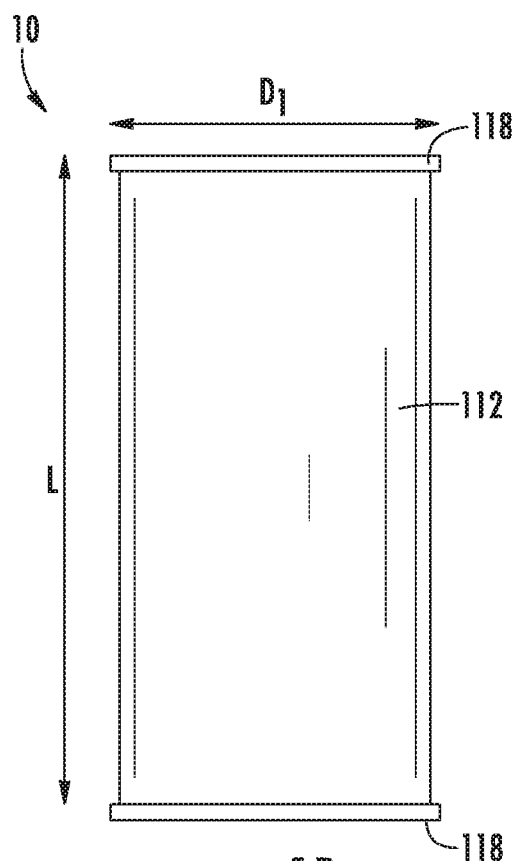
FIG. 1B is a side view of the grommet of FIG. 1A.
Figure 1C:
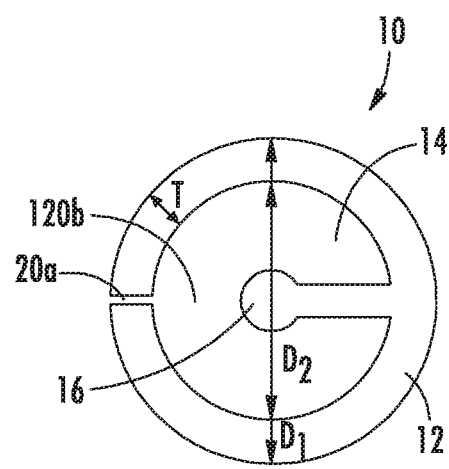
FIG. 1C is an end view of the grommet of FIG. 1A.

Referring now to the figures, a grommet 10 according to some embodiments of the present invention is illustrated in FIGS. 1A-1C. The grommet 10 is formed of a polymeric material and is adapted for bundling a plurality of discrete cables 30 (see also, e.g., FIG. 3). Exemplary types of cables 30 that may be bundled together using the grommet 10 include, but are not limited to, fiber optic cables and hybrid fiber/power cables. In some embodiments, the polymeric material forming the grommet 10 may comprise rubber, polypropylene, nylon, acetal, acrylonitrile butadiene styrene (ABS) or the like.

As shown in FIGS. 1A-1C, in some embodiments, the grommet 10 comprises a main body 12 having two ends 18. The main body 12 surrounds an interior cavity 14. In some embodiments, the ends 18 may protrude from the main body 12. The protruding ends 18 can provide additional stability when the grommet 10 is used with a cable hanger 40 (see, e.g., FIG. 5). In some embodiments, the main body 12 may have a generally cylindrical profile that surrounds the interior cavity 14. In some embodiments, the main body 12 may have a profile shape other than cylindrical, for example, the main body 12 may be hexagonal or square in profile.

The main body 12 of the grommet 10 has a length (L), a thickness (T), and a longitudinal axis defined by its length dimension. The main body 12 may have an outer diameter ($D_1$) and an inner diameter ($D_2$). The thickness (T) of the main body 12 can be determined by subtracting the inner diameter ($D_2$) from the outer diameter ($D_1$) and dividing by two (2). The diameters ($D_1$, $D_2$) of the main body 12 can vary depending on the diameter(s) of the cables 30 being bundled together. In some embodiments, the main body 12 has an inner diameter ($D_2$) from about 0.1 inches to about 10.0 inches. In some embodiments, the main body 12 has an outer diameter ($D_1$) from about 0.1 inches to about 10.0 inches. In some embodiments, the main body 12 can have a length (L) from about 0.1 inches to about 10.0 inches.

In some embodiments, the grommet 10 further comprises a central member 16. The central member 16 may be integrally coupled to the main body 12. In some embodiments, the central member 16 and main body 12 are molded as a unitary component. The central member 16 may reside within the interior cavity 14 of the main body 12 and may extend generally parallel to the longitudinal axis of the main body 12. The central member 16 may extend the entire length (L) of the grommet 10. A plurality of cables 30 can reside within the main body 12 and surround the central member 16. The central member 16 can provide stability to the grommet 10 and increase the surface friction between the grommet 10 and the cables 30. Increasing the surface friction may improve resistance to movement of the cables 30, particularly in the axial direction, and mimic a "single cable" feel. The central member 16 may also uniformly distribute compressive forces on the cables 30, thus further aiding in retention of the cables 30 within the main body 12 of the grommet 10.

In some embodiments, the grommet 10 may comprise more than one central member 16. In some embodiments, the central member 16 may be divided into multiple segments along the length (L) of the grommet 10. Dividing the central member 16 into multiple segments can provide stability to the grommet 10 while still allowing flexibility along the length (L) of the grommet 10.

In some embodiments, the main body 12 may have a slot 20a extending along its length (L). The slot 20a provides an entry point for the cables 30 to be inserted into the interior cavity 14 of the grommet 10. The polymeric material that forms the grommet 10 gives the grommet 10 a certain degree of flexibility, such that the grommet 10 may be deflected to an open position to enable insertion of the cables 30. Once the cables 30 are positioned within the interior cavity 14 of the grommet 10, the resilient nature of polymeric material allows the grommet 10 to recover to its original size, thereby bundling the cables 30 together and securing them within the grommet 10. In some embodiments, a zip tie or other clasping device may be used to further secure the grommet 10 around the plurality of cables 30.

Figure 2A:
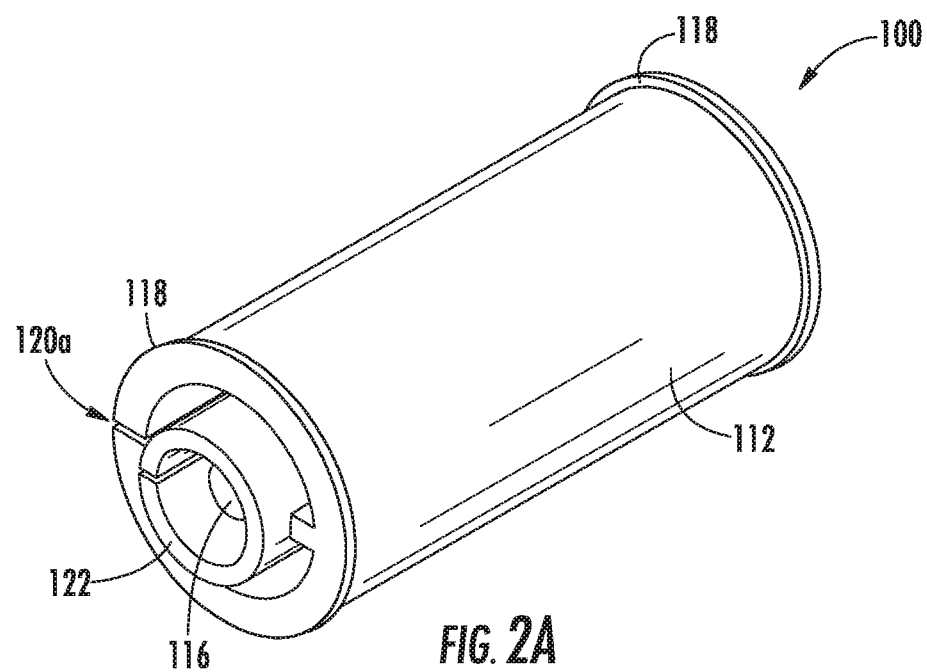
FIG. 2A is a front perspective view of a grommet according to embodiments of the present invention.
Figure 2B:
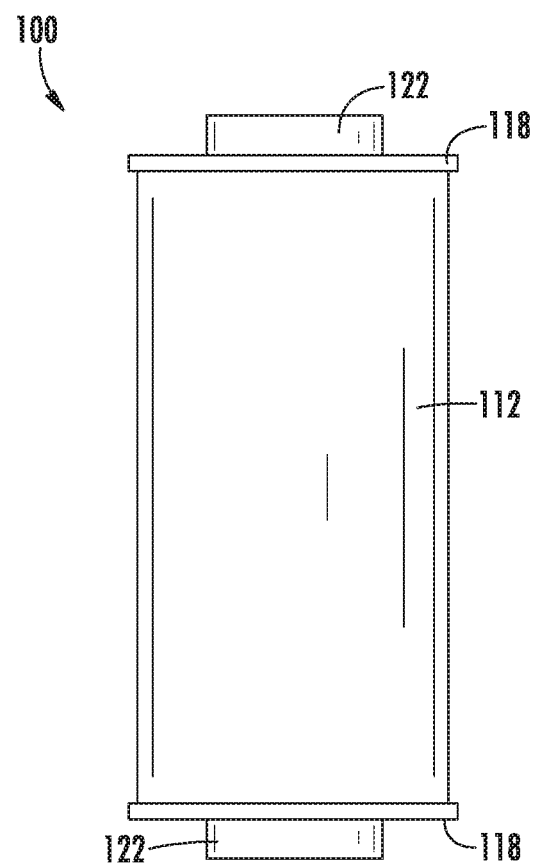
FIG. 2B is a side view of the grommet of FIG. 2A.
Figure 2C:
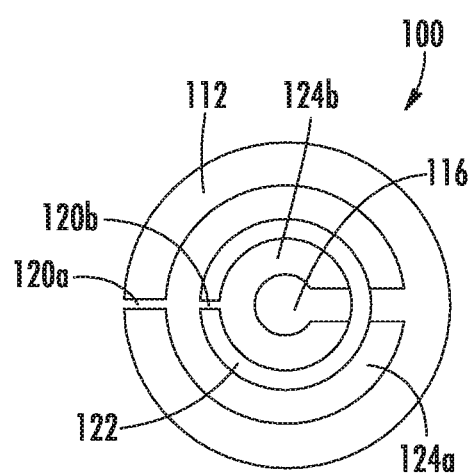
FIG. 2C is an end view of the grommet of FIG. 2A.

Referring to FIGS. 2A-2C, a grommet 100 according to some embodiments of the present invention is illustrated. The grommet 100 illustrated in FIGS. 2A-2C differs from the grommet 10 illustrated in FIGS. 1A-1C in that the grommet 100 further comprises at least one ring 122 within the interior cavity 114. The ring 122 may reside between the main body 112 and the central member 116. In some embodiments, the ring 122 extends generally parallel to the longitudinal axis of the main body 112 and divides the interior cavity 114 into concentric chambers 124a, 124b. The ring 122 may extend the entire length (L) of the grommet 100. In some embodiments, the ring 122 may have a slot 120b that allows cables to be inserted into the inner concentric chamber 124b between the ring 122 and the support member 116. A plurality of cables 130 can reside within the concentric chambers 124a, 124b created by the ring 122. The concentric chambers 124a, 124b can allow for the bundling of a varying number of cables 130 while still maintaining sufficient surface friction. As discussed above, maintaining sufficient surface friction can help minimize movement of the cables 130 within the grommet 100, particularly in the axial direction.

The thickness of the ring 122 can vary depending on the diameter(s) of the cables 130 being bundled together. For example, a ring 122 with a smaller thickness will allow for cables 130 with larger diameters to be bundled together, whereas a ring 122 with a larger thickness will allow for cables 30 with smaller diameters to be bundled together. Similarly, the diameter of the ring 122 can also vary depending on the diameter(s) of the cables 130 to be bundled. Adjusting the diameter of the ring 122 can allow for varying diameters of cables 130 to be bundled together. For example, a ring 122 with a smaller diameter can allow larger diameter cables 130 to be bundled within the outer concentric chamber 124a and smaller diameter cables 130 to be bundled within the inner concentric chamber 124b. Increasing the diameter of the ring 122 can allow smaller diameter cables 130 to be bundled within the outer concentric chamber 24a and larger diameter cables 130 to be bundled within the inner concentric chamber 124b. The diameter of the central member 116 can also vary allowing cables 130 of different diameters to be bundled together. The grommet 10 can allow for the safe compression of the bundled cables 30 without the risk of over-compression or cutting into the cable jacket which may happen with other bundling methods or implements, for example, zip ties.

In some embodiments, the ring 122 may be integrally coupled to the central member 116 and/or the main body 112. In some embodiments, the ring 122, central member 116 and main body 12 are molded as a unitary component. In some embodiments, the ring 122 may extend beyond the length (L) of the main body 112 (see, e.g., FIG. 2B). The extended ring 122 can provide extra surface area to reduce movement of the cables 130 relative to the grommet 100.

Figure 3:
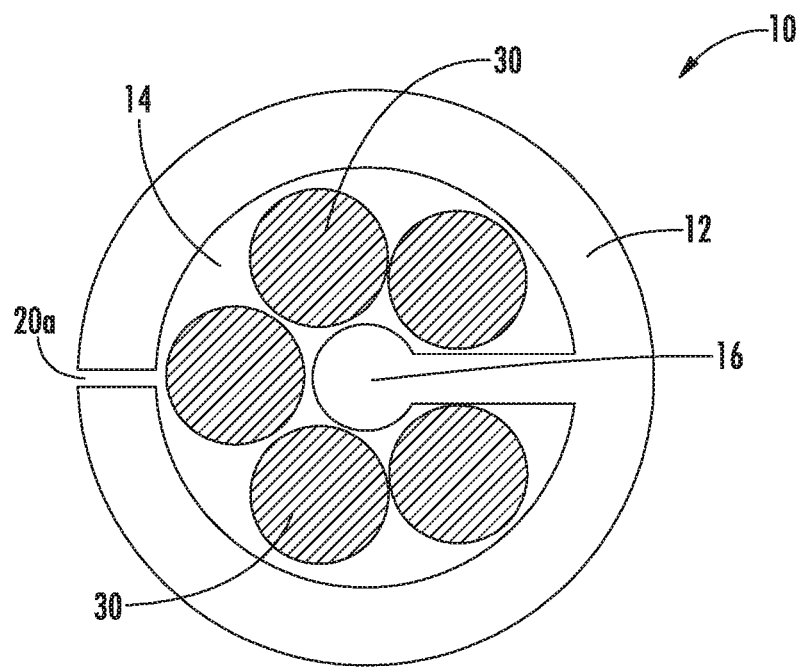
FIG. 3 is an end view illustrating the grommet of FIG. 1A bundling a plurality of discrete cables.
Figure 4:
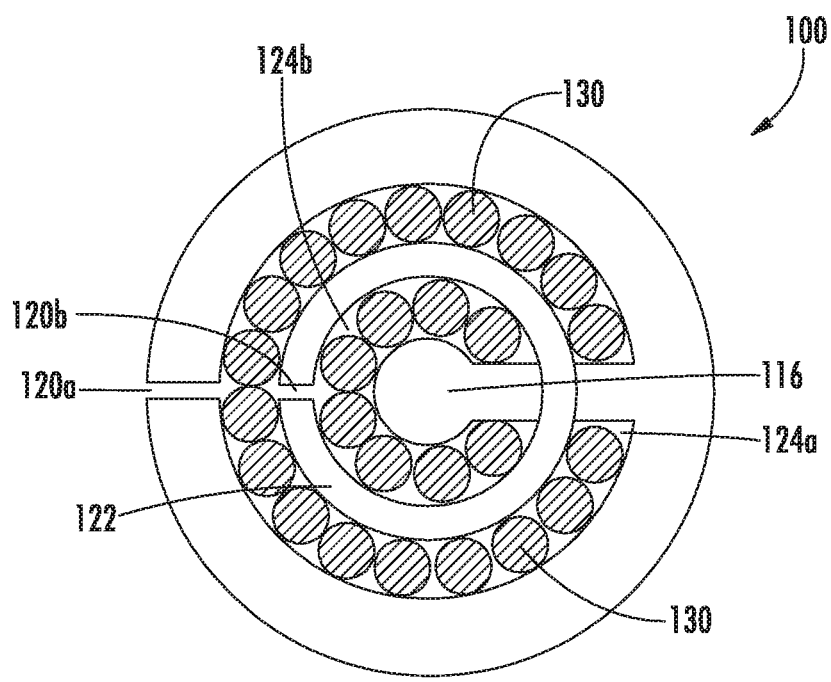
FIG. 4 is an end view showing the grommet of FIG. 2A bundling a plurality of discrete cables.

As mentioned above, FIG. 3 and FIG. 4 illustrate the grommets 10, 100 described above in combination with a plurality of discrete cables 30, 130. FIG. 3 shows the grommet 10 with a plurality of discrete cables 30 bundled together about the central member 16. As discussed above, the central member 16 can provide additional grip, i.e., surface friction between the cables 30, thereby reducing movement of the cables 30 while bundled together. FIG. 4 shows the grommet 100 with a plurality of discrete cables 130 bundled together within concentric chambers 124a, 124b. The concentric chambers 124a, 124b may allow the bundling of a varying number of cables 130 while still maintaining sufficient surface friction to reduce movement of the cables 130. The concentric chambers 124a, 124b can also allow more cables to be added later without disturbing cables 130 that may already be bundled together.

Typically, multiple grommets 10, 100 of the present invention are used to bundle from about 5 feet to about 250 feet of cable. When bundling together cables 30, 130, the grommets 10, 100 are generally spaced from about 3 feet to about 5 feet apart from each other. The cables 30, 130 being bundled together typically have a diameter from about 1 mm to about 25 mm.

Figure 5:
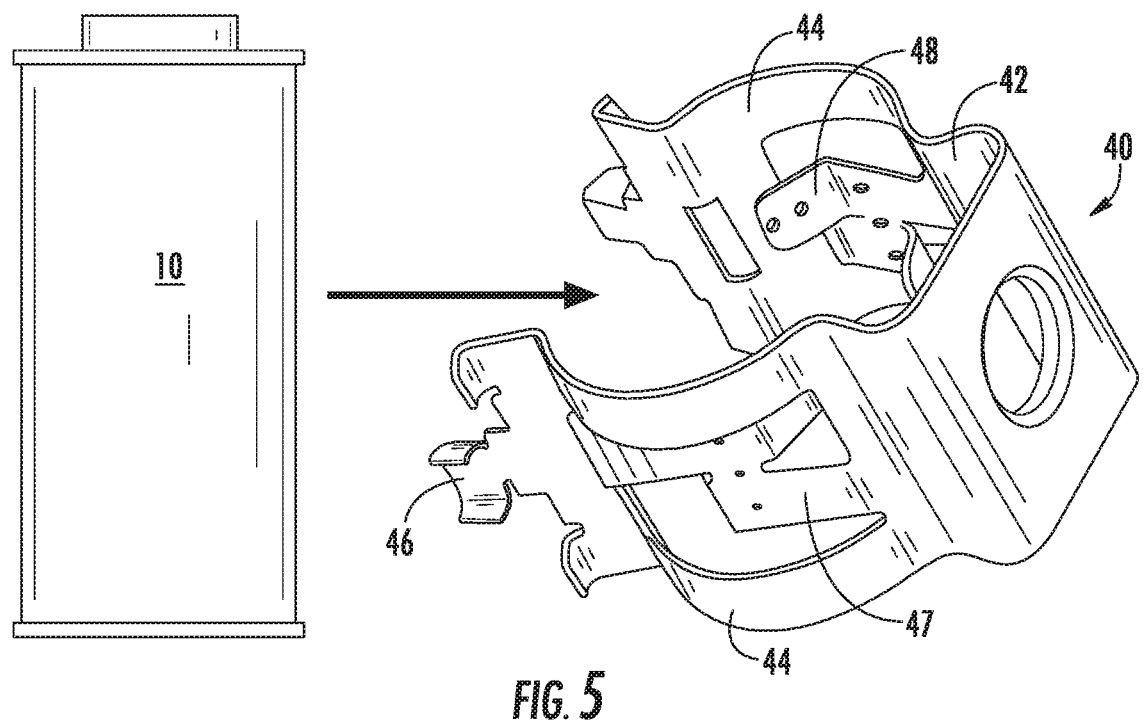
FIG. 5 is an exploded perspective view showing the grommet of FIG. 1A in combination with a cable hanger.

Referring now to FIG. 5, in some embodiments, the grommets 10, 100 may be used in combination with a cable hanger 40. Coaxial cables for power and/or signal communications are often mounted to a foundation structure, e.g., an antenna tower, via cable hangers 40, which capture the cable 30, 130 and mount it to the structure. The cable hanger 40 may include a generally C-shaped body 42 having two opposable arms 44. The opposable arms 44 may have latches 46 that extend away from the cable hanger body 42. In some embodiments, the cable hanger 40 may be dimensioned to receive the grommets 10, 100 of the present invention such that the grommets 10, 100 can be held between the opposable arms 44 of the cable hanger 40, with the ends 18, 118 engaging the upper and lower edges of the cable hanger 40. Some cable hangers 40 may have flex members 47 with gripping members 48. In some embodiments, the main body 12, 112 of the grommets 10, 100 may have at least one groove or indention (not shown) configured to allow the gripping members 48 of the cable hanger 40 to grip onto the grommet 10, 100, thereby further securing the grommet 10, 100 within the cable hanger 40. Exemplary cable hangers are shown in U.S. Pat. No. 9,306,380 to Vaccaro, U.S. Pat. No. 9,866,004 to Vaccaro et al., and U.S. Pat. No. 9,903,510 to Joshi et al., each of which are incorporated by reference in their entirety herein. The combination of the grommet 10, 100 and cable hanger 40 can be mounted to the foundation structure via the latches 46.

Figure 6:
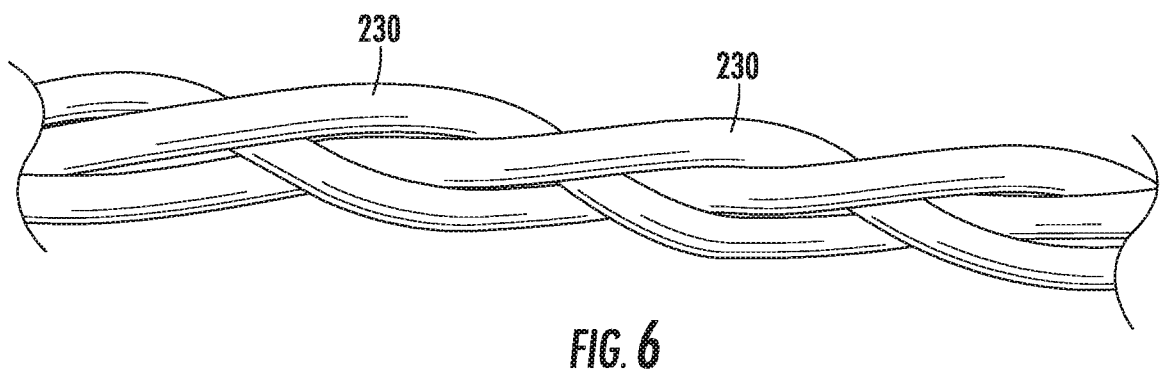
FIG. 6 shows a braided cable bundle according to embodiments of the present invention.

In another embodiment, the present invention is directed to a braided cable bundle 50, which is illustrated in FIG. 6. The braided cable bundle 50 comprises a plurality of discrete cables 230. Each cable 230 has a signal-carrying member (not shown) and a protective jacket surrounding the signal-carrying member. The plurality of cables 230 are braided together to form the cable bundle 50. Once braided, the cable bundle 50 creates a "single cable" from a plurality of individual cables 230.

The cables 230 can be braided together in a variety of braid patterns. Exemplary braid patterns that could be used include, but are not limited to, a French braid pattern, a Dutch braid pattern, and chain-link braid techniques. Exemplary braid patterns are shown in U.S. Pat. No. 5,497,795 to Hibbard (French braid) and https://www.wikihow.com/Make-a-Dutch-Braid, each of which are incorporated by reference in their entirety herein.

In some embodiments, the braided cable bundle 50 may further comprise a matrix material braided between the discrete cables 230. A matrix material may be needed to prevent over-tightening during manufacturing and/or installation. In some embodiments, a grommet may be used to prevent over-tightening. Some cables, especially fiber optic cables, can be easily damaged if bent beyond their rated minimum bend radius. The matrix material can be a layer of padding or polymeric material which can help prevent the cables 230 from being bent beyond a predetermined minimum bend radius. In some embodiments, a faux cable (not shown) of similar diameter can be braided into the cable bundle 50. The faux cable can used to help prevent the cables 230 being bundled together from being bent beyond their minimum bend radius.

Methods of bundling cables 230 are also provided. In some embodiments, the methods may comprise providing a plurality of discrete cables 230 and braiding together each of the discrete cables 230 in a predetermined braid pattern, thereby forming a single unit of braided cables 230. In some embodiments, the method may further comprise braiding a matrix material between each of the discrete cables 230.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A braided cable bundle, comprising a plurality of discrete cables, each cable having a signal-carrying member and a protective jacket surrounding the signal-carrying member, and a matrix material between the plurality of discrete cables, wherein the plurality of discrete cables and matrix material are braided together to form a cable bundle.

2. The braided cable bundle according to claim 1, wherein the cables are braided together in a predetermined braid pattern.

3. The braided cable bundle according to claim 2, wherein the predetermined braid pattern is selected from a group consisting of French braid pattern, Dutch braid pattern, and chain-link braid pattern.

4. The braided cable bundle according to claim 1, wherein the matrix material comprises a layer of padding or polymeric material.

5. The braided cable bundle according to claim 1, wherein at least one of the discrete cables is a faux cable.

6. The braided cable bundle according to claim 1, wherein the plurality of discrete cables comprises cables selected from a group consisting of fiber optic cables and hybrid fiber/power cables.

7. A method of bundling cables, comprising:
providing a plurality of discrete cables;
braiding together each of the discrete cables in a predetermined braid pattern and a matrix material between each of the discrete cables, thereby forming a single unit of braided cables, wherein the matrix material prevents the cables from reaching a bend threshold.

8. The method according to claim 7, wherein the predetermined braid pattern is selected from a group consisting of French braid pattern, Dutch braid pattern, and chain-link braid pattern.

9. The method according to claim 7, wherein the matrix material comprises a layer of padding or polymeric material.

10. A braided cable bundle, comprising a plurality of discrete cables and a matrix material between each of the discrete cables in combination with a grommet, each cable having a signal-carrying member and a protective jacket surrounding the signal-carrying member, wherein the plurality of discrete cables and matrix material are braided together to form a cable bundle, and wherein the grommet prevents the cables from reaching a bend threshold.

11. The braided cable bundle according to claim 10, wherein at least one of the discrete cables is a faux cable.

12. The braided cable bundle according to claim 10, wherein the plurality of discrete cables comprises cables selected from a group consisting of fiber optic cables and hybrid fiber/power cables.

* * * * *